(No Model.)

W. C. CARROLL.
SURGICAL PUMP.

No. 473,546. Patented Apr. 26, 1892.

Witnesses.
H. J. Bingham
A. B. Choate

Inventor
William C. Carroll
By Chas. J. Cairns
Attorney.

UNITED STATES PATENT OFFICE.

WILLIAM C. CARROLL, OF CHICAGO, ILLINOIS.

SURGICAL PUMP.

SPECIFICATION forming part of Letters Patent No. 473,546, dated April 26, 1892.

Application filed August 11, 1891. Serial No. 402,406. (No model.)

*To all whom it may concern:*

Be it known that I, WILLIAM C. CARROLL, a citizen of the United States, residing at Chicago, in the county of Cook and State of Illinois, have invented certain new and useful Improvements in Pumps Used for Surgical and other Purposes, of which the following is a specification.

My invention relates to improvements in pumps in which a flexible tube coiled within a cylindrical casing is used in connection with a traveling roller operating along the tube for drawing the liquid and propelling it along such tube.

The objects of my improvement are, first, to provide an improved means of carrying the roller for operation within the cylindrical casing, and, second, of improved means for adjusting the pressure of the roller upon the tubing, so as to regulate such pressure and so as to adapt it for the use of any size of tubing desired. I attain these objects by the mechanism illustrated in the accompanying drawings, in which—

Figure 1:
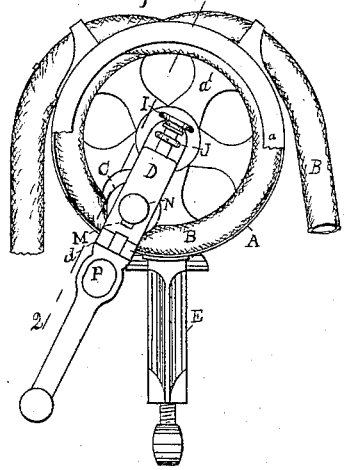
Figure 2:
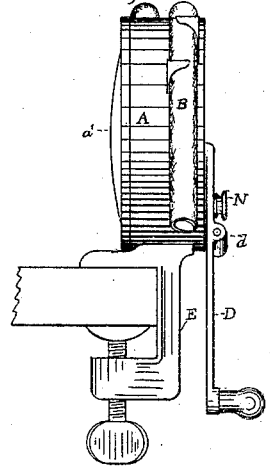
Figure 3:
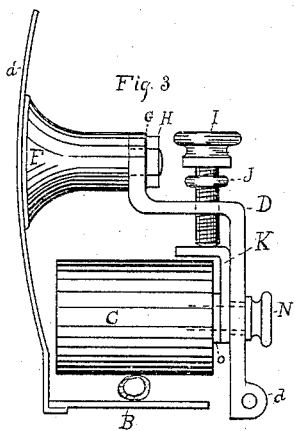
Figure 6:
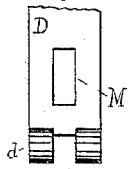
Figure 4:
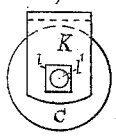
Figure 5:
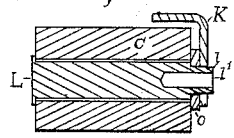
Figure 7:
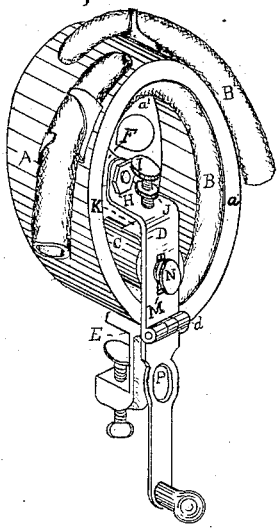

Figure 1 is a side elevation of the instrument with a portion of the rim upon the outer face broken away; Fig. 2, an edge view of the same, showing it attached to a table; Fig. 3, a vertical section of a part of the machine on the line 1 2, Fig. 1. Fig. 4 is a detail showing the roller and connected parts, looking endwise. Fig. 5 is a side view of the same; Fig. 6, a detail showing a portion of the crank with the elongated slot therein. Fig. 7 is a view of the complete machine looking obliquely.

The same letters refer to the same parts throughout the several views.

A represents the cylindrical casing. The face on the side next the crank D may be left open, with a narrow rim $a$ around the circumference of that face sufficient to confine the coil of the tubing within the casing. The opposite face $a'$ may have openings therein or be solid throughout, as desired. It should be of sufficient thickness to bear the strain brought upon it when the traveling roller C is screwed down upon the tubing B in operation.

One of the purposes of my invention is to so construct such an instrument that the entire cylindrical casing and the clamp E may be cast in one piece when desired, thereby and by the construction of the instrument in other respects to simplify the same, to cheapen the cost of its manufacture, and to adapt it for other practical purposes as well as that of a surgical pump. Leaving the face next the crank open will also greatly facilitate the insertion and removal of tubing.

The crank D is bent twice at right angles and is journaled upon the standard F, as shown in Fig. 3. The crank is secured upon the standard F by means of a nut H, between which and the crank it is desirable to place a washer G. The standard F is made in one piece with or rigidly secured to the cylindrical casing.

I is a thumb-screw passing through the horizontal portion of crank D and operating within screw-threads therein. I is provided with a stop-nut J, operating upon its shaft.

K is a plate bent once at right angles. Upon the horizontal portion of plate K the thumb-screw I impinges.

L is the axle of the traveling roller. The portion $l$ of the axle extending beyond the roller is made square and is provided with a shoulder at the point where it emerges from the roller. This axle and plate K are secured together by means of a square opening made through plate K, corresponding to the size of said square portion of the axle, upon which the plate K fits snugly. The square portion $l$ passes through such square opening of plate K and beyond its outer face, so as to be received within the elongated slot M, Fig. 6, of the crank D. A round hole $l'$ passes longitudinally within the axle L and is provided with screw-threads to receive the shaft of the thumb-screw N. By means of the thumb-screw N the plate K may be brought snugly against the inner face of the crank D and the roller C, with its axle, firmly secured in the desired position. Besides, it provides for such adjustment as will permit the sliding of the square portion $l$ of the axle within the slot M when the roller C is made to press upon the tubing or when such pressure is withdrawn. The parts K and L may be formed in one piece or secured together, as above described. Upon the axle L, between the inner surface of plate K and roller C, it is desirable to place a loose washer O, Figs. 3 and 5. The turning of crank D causes the traveling roller to pass over the tubing coiled within the cylindrical casing, and the pressure of the roller upon the tubing is made greater or less, according to the pressure desired, or is adapted to the size of the tubing by means of the thumb-screw I, pressing down upon the horizontal portion of plate K. By means of the stop-nut J the pressure permissible in screwing down thumb-screw I may be limited as desired.

In place of thumb-screw I a cam or lever arrangement may be used to operate between the horizontal portion of crank D and plate K for regulating the pressure of the roller upon the tubing; but for general purposes I prefer the method shown.

So far as concerns the operation of the other parts of the mechanism above described, the crank D may be made in one piece without any hinge; but it is usually desirable to have such crank provided with a hinge, as at $d$, for the purpose of folding the same up for convenience in carrying and storing when not in use. It is also desirable that the traveling roller be released from its pressure upon the tubing when the machine is not in use in order that the tubing may not become set and injured thereby.

I provide a slot P, Fig. 1, in the crank D, so that when the outer portion of the crank is folded inward upon the inner portion thereof the head of the thumb-screw N will enter such slot and permit the folding to be completed; but I place said slot P at such point in the handle that the roller, together with the head of the thumb-screw N, must have moved toward the center of the cylindrical casing sufficiently to release the pressure upon the tubing before the head of the thumb-screw N can be received within the slot P, thereby insuring that such pressure will be released before the machine is folded up to be laid away.

What I claim as my invention, and desire to secure by Letters Patent, is—

1. In a surgical pump, the combination of the standard F, the crank D, provided with the slot M to receive the end of the axle L, and the thumb-screw N, adapted to hold and secure the traveling roller and its axle to such handle, substantially as specified.

2. In a surgical pump, the combination of the crank D, provided with the thumb-screw I and the plate K for the purpose of adjusting the pressure of the roller upon the tubing, substantially as specified.

3. In a surgical pump, the combination of a crank bent twice at right angles for operating the same, the plate K and devices to adjust the pressure of the roller upon the tubing, operating between said crank and said plate, and devices for securing the roller and its axle adjustably to the crank, substantially as specified.

4. In a surgical pump, the combination of a hinged crank to operate the same, provided with a slot adapted to receive the head of the thumb-screw N and to permit the folding of such handle only when the pressure of the roller upon the tubing is released, substantially as shown and described.

WILLIAM C. CARROLL.

Witnesses:
 CHAS. S. CAIRNS,
 A. B. CHOATE.